(12) United States Patent
Dong

(10) Patent No.: US 11,531,437 B2
(45) Date of Patent: Dec. 20, 2022

(54) TOUCH SUBSTRATE AND MANUFACTURING METHOD THEREOF, AND DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventor: Ji Dong, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 217 days.

(21) Appl. No.: 16/772,282

(22) PCT Filed: Jul. 31, 2019

(86) PCT No.: PCT/CN2019/098735
§ 371 (c)(1),
(2) Date: Jun. 12, 2020

(87) PCT Pub. No.: WO2021/016959
PCT Pub. Date: Feb. 4, 2021

(65) Prior Publication Data
US 2022/0129115 A1    Apr. 28, 2022

(51) Int. Cl.
*G06F 3/044* (2006.01)
*G06F 3/041* (2006.01)
(Continued)

(52) U.S. Cl.
CPC ........ *G06F 3/0446* (2019.05); *G02F 1/13338* (2013.01); *G02F 1/134309* (2013.01);
(Continued)

(58) Field of Classification Search
CPC .......... G02F 1/13338; G02F 1/134309; G02F 1/136286; G06F 3/0446; G06F 3/04164;
(Continued)

(56) References Cited

U.S. PATENT DOCUMENTS

| 10,198,137 B2 | 2/2019 | Jeon et al. |
| 2015/0206501 A1 | 7/2015 | Kurasawa et al. |

(Continued)

FOREIGN PATENT DOCUMENTS

| CN | 104793817 | 7/2015 |
| CN | 108281460 | 7/2018 |

(Continued)

*Primary Examiner* — Nathanael R Briggs
*Assistant Examiner* — William D Peterson
(74) *Attorney, Agent, or Firm* — Leason Ellis LLP

(57) ABSTRACT

A touch substrate and a manufacturing method thereof, and a display panel are disclosed. The touch substrate is applicable to an array driving structure. The array driving structure includes: a first signal line extending in a first direction and a second signal line extending in a second direction intersecting with the first direction; and the touch substrate includes a touch electrode structure, and the touch electrode structure is configured to be stacked with the array driving structure and includes: a first touch electrode extending in a third direction and a second touch structure extending in a fourth direction. The third direction is different from both the first direction and the second direction; and a second touch electrode is insulated from and intersects the first touch electrode.

20 Claims, 7 Drawing Sheets

(51) Int. Cl.
  *G02F 1/1333* (2006.01)
  *G02F 1/1343* (2006.01)
  *G02F 1/1362* (2006.01)
(52) U.S. Cl.
  CPC ...... *G02F 1/136286* (2013.01); *G06F 3/0412* (2013.01); *G06F 3/0443* (2019.05); *G06F 3/04164* (2019.05); *G06F 2203/04103* (2013.01)
(58) Field of Classification Search
  CPC ................. G06F 3/0443; G06F 3/0412; G06F 2203/04103
  USPC .......................................................... 349/12
  See application file for complete search history.

(56) References Cited

U.S. PATENT DOCUMENTS

2018/0190723 A1\* 7/2018 Han ....................... G06F 3/0446
2019/0204972 A1\* 7/2019 Shin ........................ G06F 3/042

FOREIGN PATENT DOCUMENTS

CN      110018583      7/2019
TW      201135703      10/2011

\* cited by examiner

TOUCH SUBSTRATE AND MANUFACTURING METHOD THEREOF, AND DISPLAY PANEL

CROSS-REFERENCE TO RELATED PATENT APPLICATIONS

This application is a U.S. National Stage Application under 35 U.S.C. § 371 of International Patent Application No. PCT/CN2019/098735, filed Jul. 31, 2019, which is incorporated by reference in its entirety.

TECHNICAL FIELD

At least one embodiment of the present disclosure relates to a touch substrate and a manufacturing method thereof, and a display panel.

BACKGROUND

Capacitive touch panels can support touch with fingers and include a self-capacitive type and a mutual capacitive type. In a display panel using the capacitive touch panel, whether an in-cell mode or an on-cell mode is adopted, touch electrodes overlap with a display driving array. While ensuring light transmittance, reducing influence caused by the overlapping of the touch electrodes and the display driving array on a display effect is very important for improving display quality.

SUMMARY

At least one embodiment of the present disclosure provides a touch substrate, the touch substrate is applicable to an array driving structure, the array driving structure comprising: a first signal line extending in a first direction and a second signal line extending in a second direction intersecting with the first direction; the touch substrate comprising: a touch electrode structure, configured to be stacked with the array driving structure and comprising: a first touch electrode, extending in a third direction, the third direction being different from both the first direction and the second direction; and a second touch electrode, extending in a fourth direction, the second touch electrode being insulated from and intersecting the first touch electrode.

For example, in the touch substrate provided in at least one embodiment of the present disclosure, the fourth direction is different from both the first direction and the second direction.

For example, in the touch substrate provided in at least one embodiment of the present disclosure, a maximum length of the first touch electrode in the first direction is substantially equal to a maximum length of the second touch electrode in the first direction, or a maximum length of the first touch electrode in the second direction is substantially equal to a maximum length of the second touch electrode in the second direction.

For example, in the touch substrate provided in at least one embodiment of the present disclosure, the first touch electrode comprises a grid pattern, the grid pattern comprises a first grid line extending in a fifth direction and a second grid line extending in a sixth direction, and the first grid line and the second grid line intersect each other, the fifth direction is different from both the first direction and the second direction, or the sixth direction is different from both the first direction and the second direction.

For example, in the touch substrate provided in at least one embodiment of the present disclosure, the touch substrate comprises a plurality of first touch electrodes; each of the plurality of first touch electrodes comprises the grid pattern, and a first gap is between two adjacent ones of the plurality of first touch electrodes and is configured to insulate the two adjacent ones of the plurality of first touch electrodes from each other.

For example, in the touch substrate provided in at least one embodiment of the present disclosure, both the first grid line and the second grid line are made from a transparent conductive material or a metallic material.

For example, in the touch substrate provided in at least one embodiment of the present disclosure, the second touch electrode comprises a plurality of electrode blocks and a plurality of connection portions; the plurality of electrode blocks and the plurality of connection portions are alternately distributed in the fourth direction, the plurality of electrode blocks are arranged in a same layer as the first touch electrode, and the plurality of connection portions are arranged in a different layer from the first touch electrode and are electrically connected with two adjacent ones of the plurality of electrode blocks, so that the plurality of electrode blocks are electrically connected with one another through the plurality of connection portions.

For example, in the touch substrate provided in at least one embodiment of the present disclosure, the touch substrate comprises a plurality of second touch electrodes, the plurality of second touch electrodes are arranged in a different layer from the first touch electrode, a second gap is between the plurality of second touch electrodes and is configured to insulate the plurality of second touch electrodes from one another.

For example, in the touch substrate provided in at least one embodiment of the present disclosure, the array driving structure is a display array structure comprising a pixel array, and the pixel array comprises a plurality of sub-pixels arranged in an array; and the touch electrode structure and the display array structure are arranged on a base substrate; an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate.

For example, in the touch substrate provided in at least one embodiment of the present disclosure, the pixel array comprises a black matrix that defines the plurality of sub-pixels arranged in the array; the first grid line and the second grid line each comprises a first sawtooth edge, and each of the plurality of electrode blocks comprises a second sawtooth edge; a planar shape of the first sawtooth edge is complementary to a planar shape of the second sawtooth edge, and an orthographic projection of the first sawtooth edge on the base substrate at least partially overlaps with an orthographic projection of the black matrix on the base substrate.

For example, in the touch substrate provided in at least one embodiment of the present disclosure, a third gap is between the first sawtooth edge and the second sawtooth edge, so that each of the plurality of electrode blocks is insulated from both the first grid line and the second grid line of the first touch electrode.

For example, in the touch substrate provided in at least one embodiment of the present disclosure, the touch substrate comprises a plurality of first touch electrodes; and each of the plurality of first touch electrodes comprises the grid pattern, and a first gap is between two adjacent ones of the plurality of first touch electrodes and is configured to insulate the two adjacent ones of the plurality of first touch electrodes from each other; the second touch electrode comprises a plurality of electrode blocks and a plurality of connection portions; and the plurality of electrode blocks and the plurality of connection portions are alternately distributed in the fourth direction, the plurality of electrode blocks are arranged in a same layer as the first touch electrode, and the plurality of connection portions are arranged in a different layer from the first touch electrode and are electrically connected with two adjacent ones of the plurality of electrode blocks, so that the plurality of electrode blocks are electrically connected with one another through the plurality of connection portions; the array driving structure is a display array structure comprising a pixel array, and the pixel array comprises a plurality of sub-pixels arranged in an array; the touch electrode structure and the display array structure are arranged on the base substrate; a planar shape of a first sawtooth edge is complementary to a planar shape of a second sawtooth edge; an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate; a third gap is between the first sawtooth edge and the second sawtooth edge, so that each of the plurality of electrode blocks is insulated from both the first grid line and the second grid line of the first touch electrode; the touch substrate comprises a plurality of second touch electrodes, the plurality of second touch electrodes are arranged in a different layer from the first touch electrode, and a second gap is between the plurality of second touch electrodes and is configured to insulate the plurality of second touch electrodes from one another; and both the first grid line and the second grid line are made from a transparent conductive material or a metallic material.

At least one embodiment of the present disclosure provides a display panel, comprising the touch substrate provided by any one of the embodiments of the present disclosure and the array driving structure, wherein the array driving structure is a display array structure comprising a pixel array.

For example, in the display panel provided in at least one embodiment of the present disclosure, the display panel is an in-cell liquid crystal display panel, and the liquid crystal display panel comprises a first substrate and a second substrate opposite to each other, the touch electrode structure is located on a side of the first substrate facing towards the second substrate, and the array driving structure is located on a side of the second substrate facing towards the first substrate.

For example, in the display panel provided in at least one embodiment of the present disclosure, the first touch electrode and the second touch electrode are further configured as common electrodes of the liquid crystal display panel.

For example, in the display panel provided in at least one embodiment of the present disclosure, the first signal line is a gate line for the pixel array, and the second signal line is a data line for the pixel array.

At least one embodiment of the present disclosure provides a manufacturing method of a touch substrate, the touch substrate being applicable to an array driving structure, and the array driving structure comprising: a first signal line extending in a first direction and a second signal line extending in a second direction intersecting with the first direction; and the manufacturing method comprising: forming a touch electrode structure, wherein the touch electrode structure is configured to be stacked with the array driving structure; the forming the touch electrode structure comprises: forming a first touch electrode, wherein the first touch electrode extends in a third direction, and the third direction is different from both the first direction and the second direction; and forming a second touch electrode, wherein the second touch electrode extends in a fourth direction, and the second touch electrode is insulated from and intersects the first touch electrode.

For example, in the manufacturing method provided in at least one embodiment of the present disclosure, the fourth direction is different from the first direction and the second direction.

For example, in the manufacturing method provided in at least one embodiment of the present disclosure, the first touch electrode comprises a grid pattern, the grid pattern comprises a first grid line and a second grid line which intersect each other, the first grid line extending in a fifth direction, the second grid line extending in a sixth direction, the fifth direction is different from both the first direction and the second direction, or the sixth direction is different from both the first direction and the second direction.

For example, in the manufacturing method provided in at least one embodiment of the present disclosure, the touch substrate comprises a plurality of first touch electrodes; each of the plurality of first touch electrodes comprises the grid pattern, and a first gap is between two adjacent ones of the plurality of first touch electrodes and is configured to insulate the two adjacent ones of the plurality of first touch electrodes from each other.

For example, in the manufacturing method provided in at least one embodiment of the present disclosure, wherein the forming the second touch electrode comprises: forming a plurality of electrode blocks and a plurality of connection portions; wherein the plurality of electrode blocks and the plurality of connection portions are alternately distributed in the fourth direction; and the plurality of electrode blocks and the first touch electrode are formed by performing a single patterning process on a same film layer, and each of the plurality of connection portions is arranged in a different layer from the first touch electrode and is electrically connected with two adjacent ones of the plurality of electrode blocks, so that the plurality of electrode blocks are electrically connected with one another through the plurality of connection portions.

For example, in the manufacturing method provided in at least one embodiment of the present disclosure, wherein the touch substrate comprises a plurality of second touch electrodes, the plurality of second touch electrodes are arranged in a different layer from the first touch electrode, and a second gap is between the plurality of second touch electrodes and is configured to insulate the plurality of second touch electrodes from one another.

For example, in the manufacturing method provided in at least one embodiment of the present disclosure, the array driving structure is a display array structure comprising a pixel array, and the pixel array comprises a plurality of sub-pixels arranged in an array; and an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate.

For example, the manufacturing method provided in at least one embodiment of the present disclosure comprising: providing the array driving structure; and forming the touch electrode structure on the array driving structure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
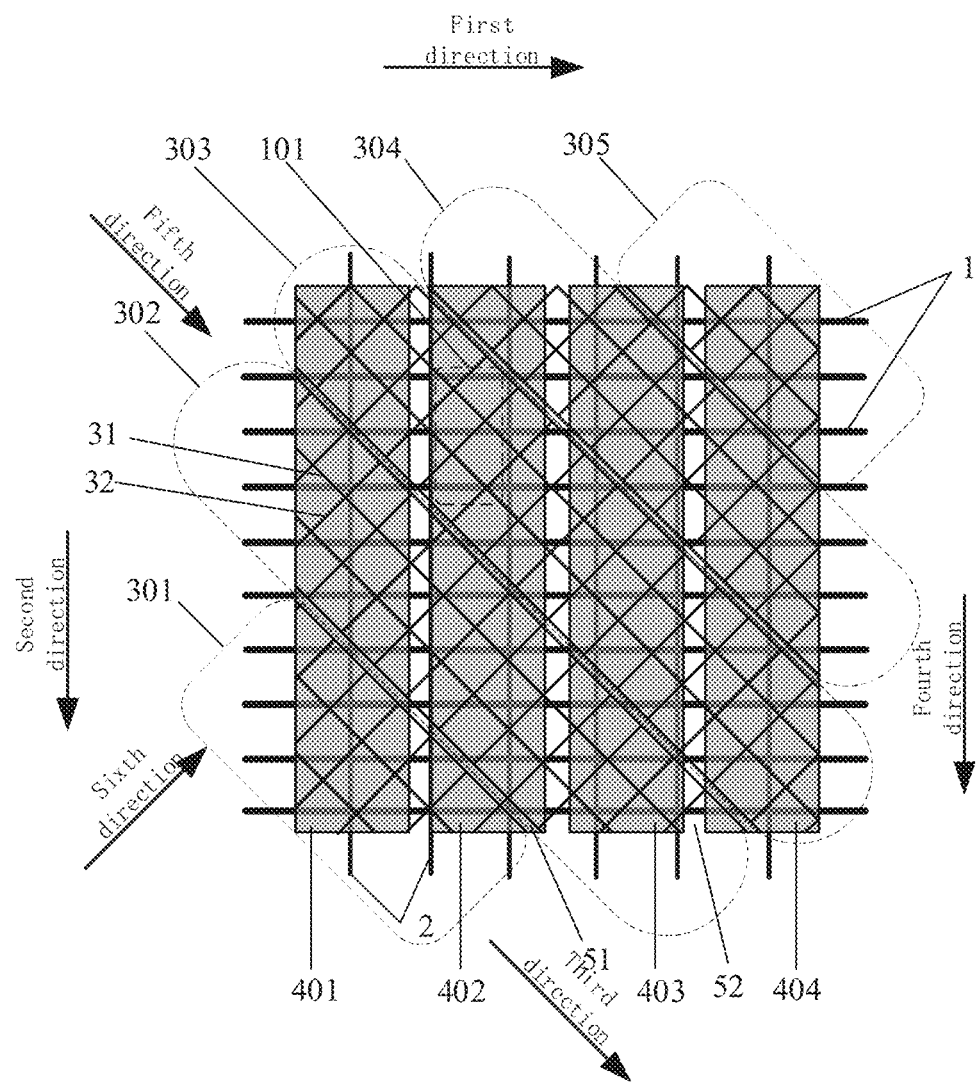
FIG. 1 is a schematic diagram of a touch substrate applied to an array driving structure and provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The drawings in the present disclosure are not drawn strictly according to an actual proportion, numbers of various structures such as first touch electrodes, second touch electrodes, first grid lines and second grid lines are not limited to specific numbers as illustrated in the drawings, and specific sizes and numbers of various structures can be determined according to actual requirements. The drawings described in the present disclosure are only structurally schematic diagrams.

At least one embodiment of the present disclosure provides a touch substrate, the touch substrate is applicable in combination with an array driving structure. The array driving structure includes: a first signal line extending in a first direction and a second signal line extending in a second direction intersecting with the first direction; and the touch substrate includes a touch electrode structure, and the touch electrode structure is configured to be stacked with the array driving structure and includes: a first touch electrode extending in a third direction and a second touch electrode extending in a fourth direction. The third direction is different from both the first direction and the second direction; and the second touch electrode is insulated from and intersects the first touch electrode.

Exemplarily, FIG. 1 is a schematic diagram of a touch substrate applied to an array driving structure and provided by at least one embodiment of the present disclosure. As illustrated in FIG. 1, the array driving structure includes first signal lines 1 extending in a first direction and second signal lines 2 extending in a second direction intersecting with the first direction. For example, the array driving structure is a display array structure, and the display array structure includes a pixel array. For example, the first signal line is a gate line for the pixel array, and the second signal line is a data line for the pixel array. For example, in FIG. 1, the first signal line and the second signal line are perpendicular to each other. Of course, in other embodiments, the first signal line and the second signal line may not be perpendicular to each other. The touch substrate comprises a touch electrode structure, and the touch electrode structure is configured to be stacked with the array driving structure, for example, the touch electrode structure is disposed on a working side (for example, a display side) of the array driving structure, so that a working region of the touch electrode structure and a working region of the array driving structure overlap with each other in a direction perpendicular to a plane where the array driving structure is located.

For example, the touch substrate comprises a base substrate, and the array driving structure and the touch electrode structure are disposed on the base substrate, that is, the touch electrode structure is configured to be stacked with the array driving structure in a direction perpendicular to the base substrate, and the touch electrode structure and the array driving structure at least partially overlap each other in the direction perpendicular to the base substrate. Moreover, the touch electrode structure includes: a first touch electrode 303 extending in a third direction and a second touch electrode 402 extending in a fourth direction. The touch substrate as illustrated in FIG. 1 comprises a plurality of first touch electrodes 301/302/303/304/305 and a plurality of second touch electrodes 401/402/403/404, and a positional relationship therebetween is explained herein by taking the first touch electrode 303 and the second touch electrode 402 as an example. The third direction is different from both the first direction and the second direction, that is, the third direction has a first included angle with the first direction and a second included angle with the second direction, respectively. The second touch electrode 401 is insulated from and intersects the first touch electrode 301.

In the touch substrate provided by at least one embodiment of the present disclosure, the third direction is different from both the first direction and the second direction. In a situation that the first signal line 1, the second signal line 2 and the first touch electrode 301 each has an electric signal, compared with the case where the third direction is the same as the first direction or the second direction, a difference between an overlapping area where the first signal line 1 or the second signal line 2 overlaps the first touch electrode 301 with the electric signal and an overlapping area where the first signal line 1 or the second signal line 2 overlaps the second touch electrode 401 with the electrical signal is reduced; it may also be understood that the coupling capacitances are similar or substantially the same. Thus, at various positions of the entire touch substrate, a difference between mutual influence between the electrical signal on the first touch electrode and a signal on the first signal line or the second signal line, and mutual influence between the electrical signal on the second touch electrode and the signal on the first signal line or the second signal line is reduced, so that the above-mentioned coupling capacitance is more uniform at various positions of the entire touch substrate. In this way, a working state of the array driving structure using the touch substrate is more uniform at various positions, avoiding the problem that because the coupling capacitance generated by the first touch electrode and the first signal line or the second signal line is greatly different from the coupling capacitance generated by the second touch electrode and the first signal line or the second signal line, working states at some positions obviously differ from those at other positions.

For example, in at least one embodiment, in a situation that the array driving structure is a display array structure, a display panel using the touch substrate and the display array structure of the above-mentioned embodiment will not cause horizontal stripes or uneven grayscale due to a great difference in the coupling capacitances as described above, for example, a gray scale of a sub-pixel overlapping with the first touch electrode in the direction perpendicular to the base substrate is greatly different from a gray scale of a sub-pixel overlapping with the second touch electrode in the direction perpendicular to the base substrate.

Figure 2:
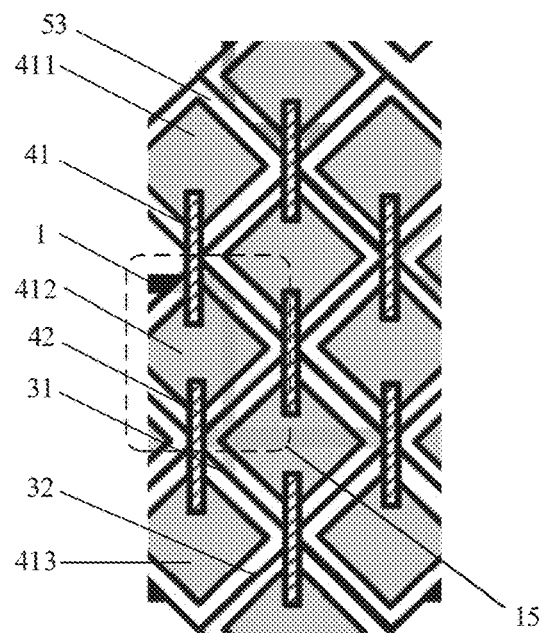
FIG. 2 is a partially enlarged schematic diagram of the touch substrate including a second touch electrode in FIG. 1.

FIG. 2 is a partially enlarged schematic diagram of one example of the touch substrate in the embodiment as illustrated in FIG. 1. As illustrated in FIG. 2, each second touch electrode includes a plurality of electrode blocks 411/412/413 and a plurality of connection portions 41/42. In the fourth direction, the plurality of electrode blocks 411/412/413 and the plurality of connection portions 41/42 are alternately distributed. For example, the plurality of electrode blocks 411/412/413 are arranged in the same layer as the first touch electrode, and each of the plurality of connection portions 41/42 is arranged in a different layer from the first touch electrode and is electrically connected with two adjacent ones of the plurality of electrode blocks 411/412/413. As illustrated in the diagram, the connection portion 41 is electrically connected with the electrode blocks 411/412, and the connection portion 42 is electrically connected with the electrode blocks 412/413, so that the plurality of electrode blocks 411/412/413 are electrically connected with one another through the plurality of connection portions 41/42, and are thus connected in series as a whole to form the second touch electrode. The plurality of electrode blocks of the first touch electrode and the second touch electrode are arranged in the same layer, which is beneficial for thinning of the touch substrate, thereby facilitating use of the touch substrate to make a thin and light device, for example, facilitating realization of a thin and light display device.

For example, in another embodiment, in a display panel comprising the touch panel, the connection portions 41/42 may be fabricated in the same layer as the second signal line. For example, the first signal line is a gate line, the second signal line is a data line that intersects the gate line to define a plurality of pixel units, and each of the plurality of pixel units includes a plurality of sub-pixel units (for example, RGB sub-pixel units), and the data line is configured as a signal line that provides a display signal to pixel electrodes in the plurality of sub-pixel units. Each of the connection portions 41/42 is electrically connected with two adjacent ones in the plurality of electrode blocks 411/412/413 through via holes, respectively, to simplify the structure of the display panel.

Figure 3A:
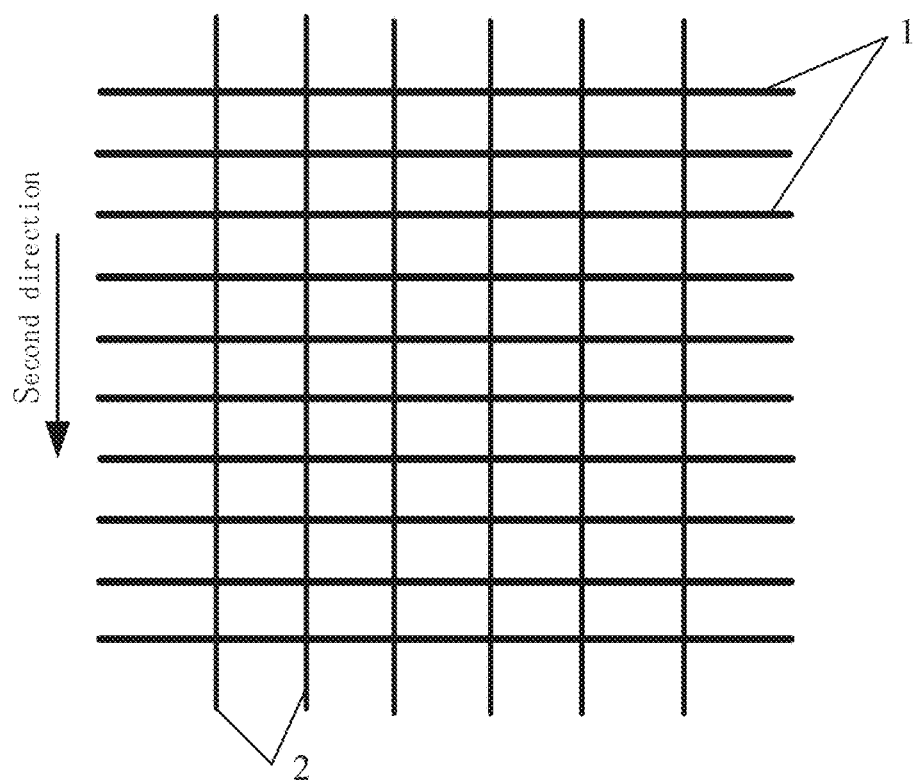
FIG. 3A is a schematic diagram of the array driving structure in FIG. 1.
Figure 3B:
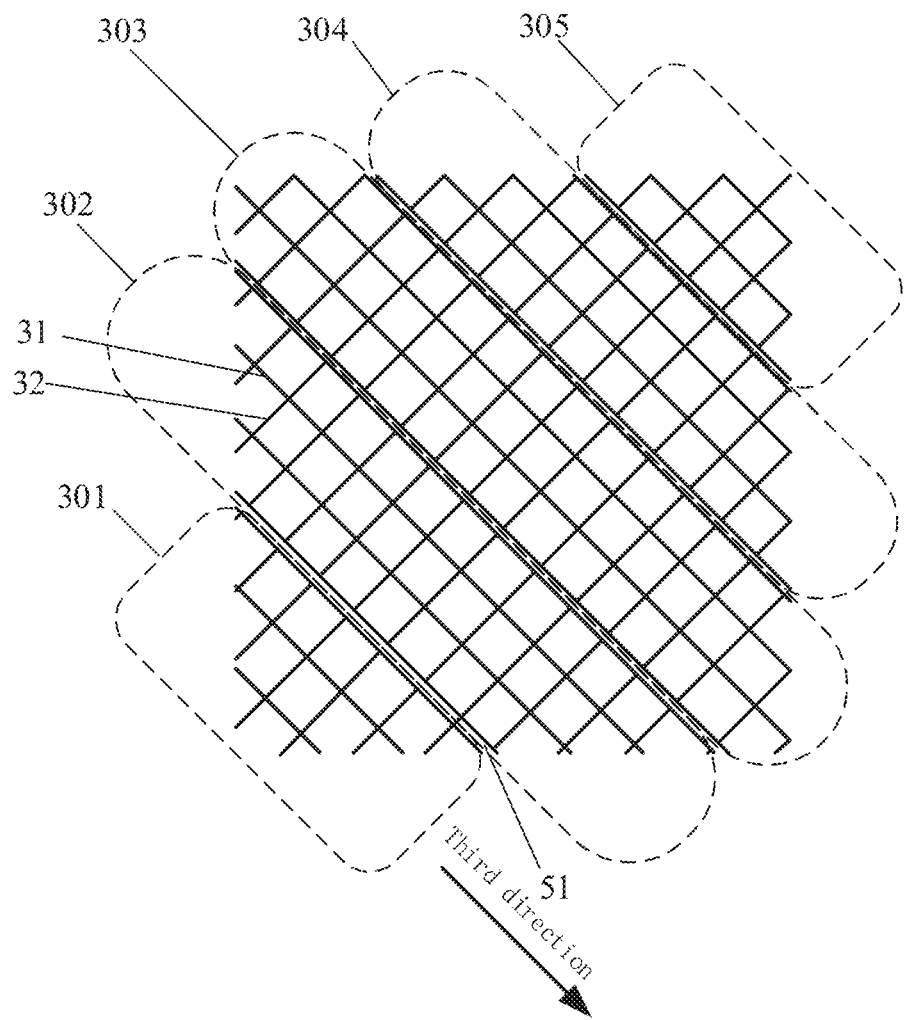
FIG. 3B is a schematic diagram of a first touch electrode in FIG. 1.
Figure 3C:
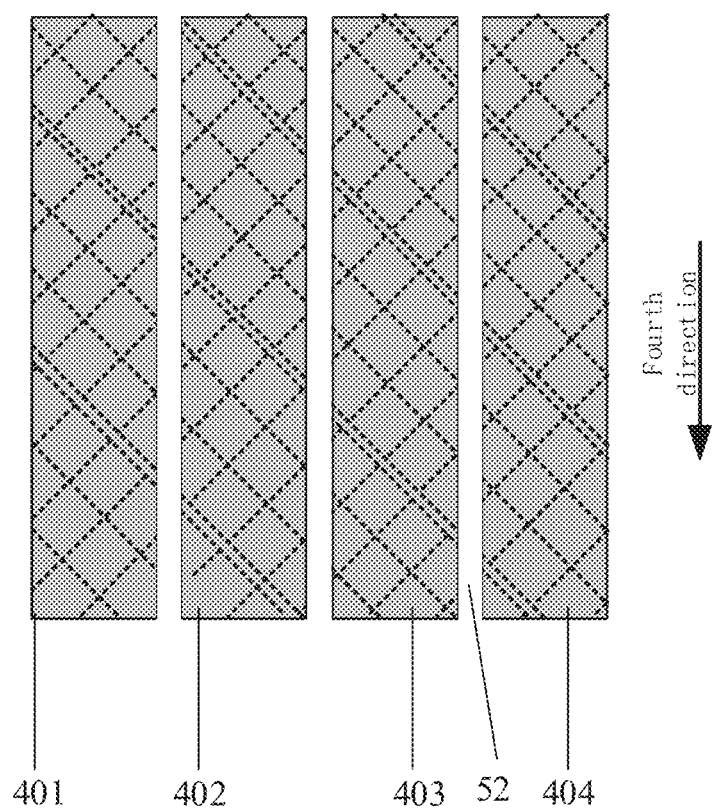
FIG. 3C is a schematic diagram of an second touch electrode in FIG. 1.

FIG. 3A is a schematic diagram of one example of the array driving structure in the embodiment as illustrated in FIG. 1, FIG. 3B is a schematic diagram of one example of a first touch structure in the embodiment as illustrated in FIG. 1, and FIG. 3C is a schematic diagram of one example of a second touch structure in the embodiment as illustrated in FIG. 1.

In combination with FIG. 1 and FIGS. 3A to 3C, for example, the touch substrate comprises a plurality of second touch electrodes 401/402/403/404, second gaps 52 are provided between the plurality of second touch electrodes and are configured to insulate the plurality of second touch electrodes from one another. Each of the plurality of second touch electrodes 401/402/403/404 includes the above-mentioned plurality of electrode blocks and the plurality of connection portions.

For example, the first touch electrode have a grid pattern, the grid pattern includes first grid lines 31 extending in a fifth direction and second grid lines 32 extending in a sixth direction. The first grid lines 31 and the second grid lines 32 intersect each other, the fifth direction is different from both the first direction and the second direction, or the sixth direction is different from both the first direction and the second direction. Thus, compared with the case where the fifth direction is the same as the first direction or the second direction, or compared with the case where the sixth direction is the same as the first direction or the second direction, at various positions in the first direction or in the second direction, a difference in overlapping area where the first touch electrode overlaps the first signal line or the second signal line is reduced. In the present embodiment, because one first signal line or one second signal line has only one intersection point with the same first grid line or second grid line, that is, the first grid line or the second grid line only overlaps with the first signal line or the second signal line at a position of the intersection point, therefore, the overlapping area between the first touch electrode and the first signal line is substantially equal to the overlapping area between the first touch electrode and the second signal line, and their coupling capacitances are similar to each other, and therefore, the coupling capacitance is relatively uniform at various positions. For example, in a situation that the array driving structure is a display array structure, by using the above-mentioned touch substrate and the display array structure, horizontal strips or gray scales caused by a great difference in overlapping area between the first touch electrode and the first signal line or the second signal line at various positions in the first direction or in the second direction of the display panel can be avoided.

For example, in combination with FIG. 1 and FIGS. 3A to 3B, the touch substrate comprises a plurality of first touch electrodes 301/302/303/304/305, each of the plurality of first touch electrodes 301/302/303/304/305 has a grid pattern, and a first gap 51 is between two adjacent ones of the plurality of first touch electrodes 301/302/303/304/305 and is configured to insulate the two adjacent ones of the plurality of first touch electrodes 301/302/303/304/305 from each other.

For example, the first grid line 31 and the second grid line 32 are both straight line segments, and two adjacent ones in the plurality of first touch electrodes 301/302/303/304/305, for example, the first touch electrodes 301/302, are respectively located on a first side of the first gap 51 and a second side of the first gap 51; for example, an extension line of each second grid line 32 of the first touch electrode 301 spans the first gap 51 to coincide with one of the plurality of second grid lines 32 of the first touch electrode 302, thereby enabling the display panel using the touch substrate of the present embodiment to have a more uniform display effect.

For example, as illustrated in FIG. 2, third gaps 53 are between the plurality of electrode blocks 411/412/413 and the first grid line 31 as well as the plurality of electrode blocks 411/412/413 and the second grid line 32 of the first touch electrode, so that the plurality of electrode blocks 411/412/413 are insulated from the first touch electrode, that is, the second touch electrode is insulated from the first touch electrode. Broken lines in FIG. 3C represent the third gaps 53.

For example, both the first grid line 31 and the second grid line 32 are made from a transparent conductive material or a metallic material. The transparent conductive material is, for example, indium tin oxide (ITO) or indium zinc oxide (IZO); the metallic material is, for example, copper, aluminum, a copper alloy, an aluminum alloy, or the like. It may be understood that the materials of the first grid line 31 and the second grid line 32 are not limited to the categories listed above.

For example, the array driving structure is a display array structure, which includes pixel arrays, and the pixel array includes a plurality of sub-pixels arranged in an array. For example, the touch electrode structure and the display array structure are arranged on the base substrate. The first grid lines 31 and the second grid lines 32 define a plurality of grids, and an orthographic projection of each of the plurality of grids on the base substrate overlaps with an orthographic projection of at least one of the plurality of sub-pixels on the base substrate. For example, orthographic projections of the first grid line 31, the second grid line 32, and each of the plurality of electrode blocks 411/412/413 on the base substrate all overlap with the orthographic projection of at least one of the plurality of sub-pixels on the base substrate. The embodiment of the present disclosure does not limit a specific number of the above-mentioned overlapping sub-pixels.

For example, the first included angle and the second included angle are both 45 degrees, and therefore, a planar shape of each of the plurality of grids defined by the first grid lines 31 and the second grid lines 32 is a rhombus, so that the grid pattern of the first touch electrodes is symmetric and uniform, thus, the display panel using the touch substrate of the present embodiment has a more uniform display effect.

For example, in a situation that the touch substrate is applied to a display panel, and the materials of the first grid line 31 and the second grid line 32 are opaque metallic materials, the first grid line 31 and the second grid line 32 overlap with a black matrix of the pixel array in the direction perpendicular to the base substrate, so as to facilitate increasing an aperture ratio of a touch display device. In a situation that the materials of the first grid line 31 and the second grid line 32 are the transparent conductive materials, the first grid line 31 and the second grid line 32 are not necessarily arranged to overlap with the black matrix of the pixel array in the direction perpendicular to the base substrate, so as to facilitate flexible design of the pixel array and the first grid line 31 and the second grid line 32.

Figure 6:
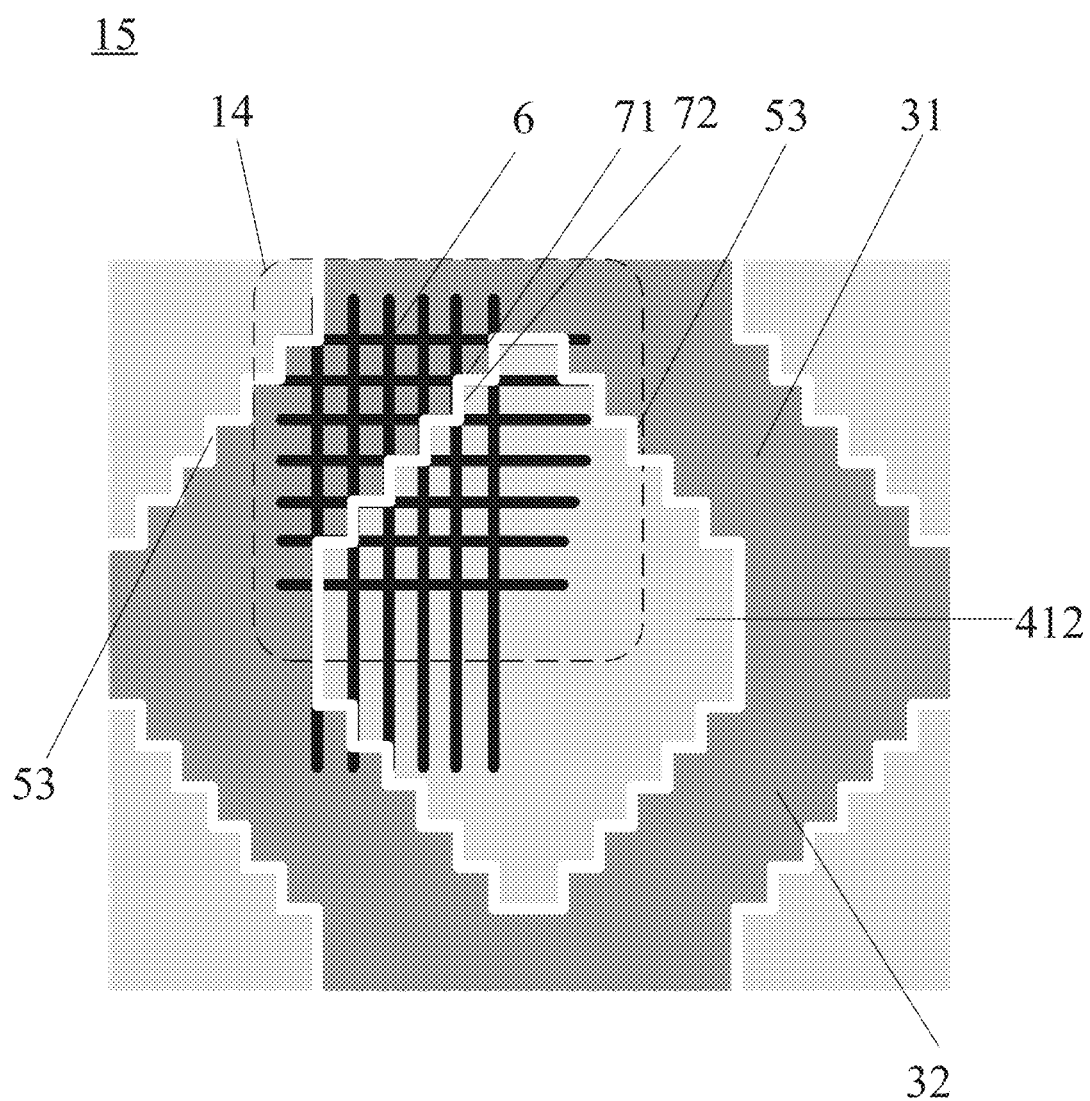
FIG. 6 is a partially enlarged schematic diagram including a first sawtooth edge and a second sawtooth edge in FIG. 2.

FIG. 6 is a partially enlarged schematic diagram of a first sawtooth edge and a second sawtooth edge in FIG. 2. In FIG. 6, the electrode block 412 in the plurality of electrode blocks 411/412/413 is taken as an example for description, and it is always the same for each of the plurality of electrode blocks 411/412/413. For example, referring to FIGS. 2 and 6, a pixel array includes a black matrix 6 that defines a plurality of sub-pixels arranged in an array. FIG. 6 only illustrates a part of the black matrix 6 in FIG. 6 as an example for description, that is, a part 15 including the first sawtooth edge, a second sawtooth edge 72, and the black matrix 6 in FIG. 6 is taken as an example for description. For example, in the entire display panel comprising the touch substrate, positional relationships between the black matrix 6 and the first sawtooth edge 71 and the second sawtooth edge 72 are both the same. The first grid line 31 and the second grid line 32 each includes the first sawtooth edge 71, and each of the plurality of electrode blocks 411/412/413 includes the second sawtooth edge 72. A planar shape of the first sawtooth edge 72 is complementary to a planar shape of the second sawtooth edge 72, an orthographic projection of the first sawtooth edge 71 on the base substrate at least partially overlaps with an orthographic projection of the black matrix 6 on the base substrate. For example, each of the plurality of electrode blocks 411/412/413 includes the second sawtooth edge 72. An orthographic projection of the first sawtooth edge 71 on the base substrate is within the orthographic projection of the black matrix on the base substrate. As such, in the display panel using the touch substrate of the present embodiment, the first grid line 31 and the second grid line 32 each corresponds to an integer number of sub-pixels; because the third direction is different from both the first direction and the second direction, a difference between a number of sub-pixels corresponding to the first touch electrode and a number of sub-pixels corresponding to the second touch electrode in a direction of each row of pixel units can be reduced in the first direction and the second direction, thereby, avoiding a gray scale difference caused by a great difference in coupling between the first touch electrode and second touch electrode and the first signal line or the pixel electrode in the display process.

For example, a third gap 53 is between the first sawtooth edge 71 and the second sawtooth edge 72, so that each of the plurality of electrode blocks 411/412/413 is insulated from the first grid line 31 and the second grid line 32 of the first touch electrode.

Figure 4:
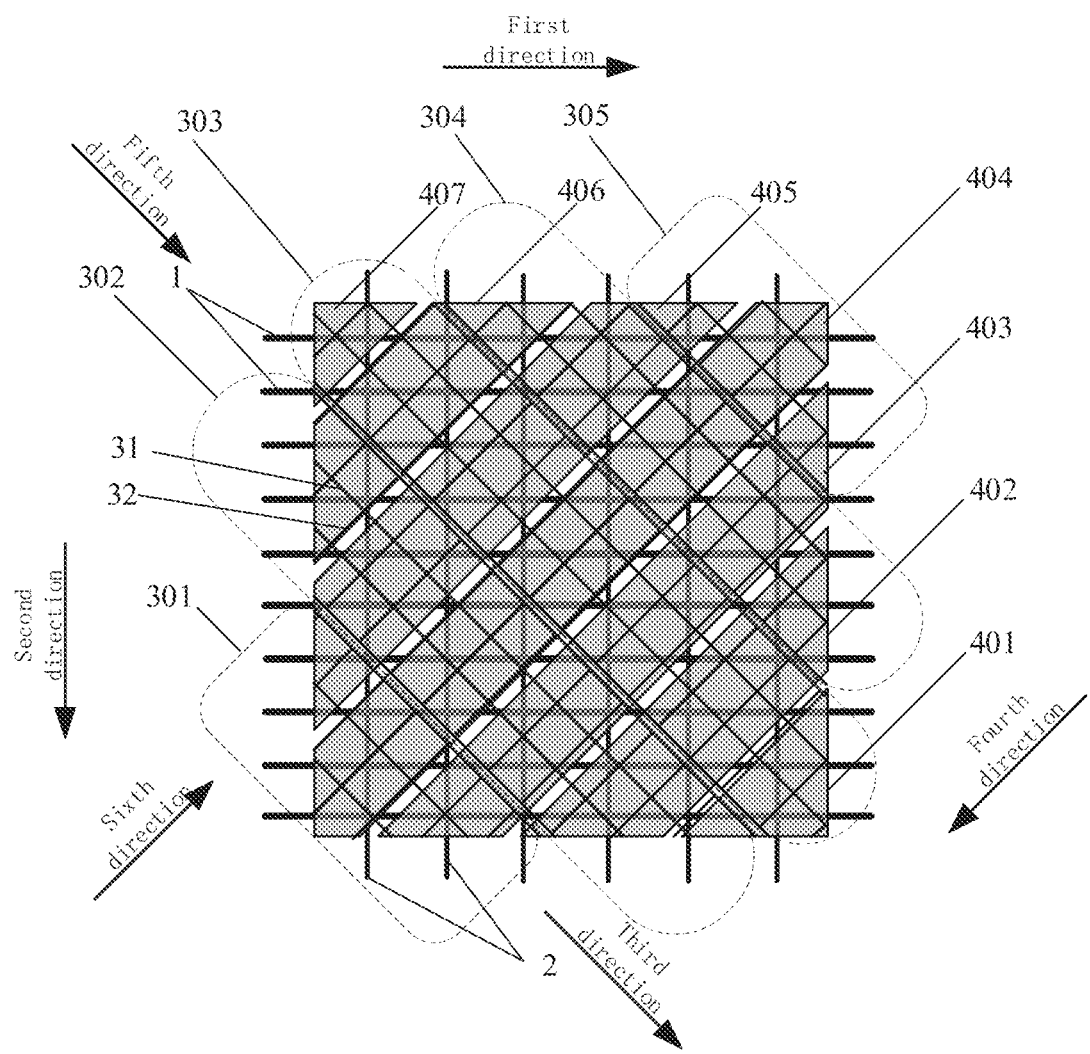
FIG. 4 is a schematic diagram of another touch substrate applied to an array driving structure and provided by an embodiment of the present disclosure.

FIG. 4 is a schematic diagram of another touch substrate applied to an array driving structure and provided by an embodiment of the present disclosure. A difference between the embodiment as illustrated in FIG. 4 and the above-mentioned embodiment is that: the fourth direction is different from both the first direction and the second direction, and the fourth direction has a third included angle and a fourth included angle respectively with the first direction and the second direction. That is, as illustrated in FIG. 4, an extending direction of a plurality of second touch electrodes

401/402/403/404/405/406/407 has a third included angle and a fourth included angle respectively with the first direction and the second direction. This can further reduce a difference between an overlapping area where the first signal line 1 or the second signal line 2 with the electrical signal overlaps the first touch electrode with the electrical signal and an overlapping area where the first signal line 1 or the second signal line 2 with the electrical signal overlaps the second touch electrode with the electrical signal, so that the coupling capacitance generated between the first touch electrode and the first signal line 1 or the second signal line 2 is similar to or substantially same as the coupling capacitance generated between the second touch electrode and the first signal line 1 or the second signal line 2, so as to better avoid the above-mentioned problem, that is, the coupling capacitance generated by the first touch electrode and the first signal line or the second signal line is greatly different from the coupling capacitance generated by the second touch electrode and the first signal line or the second signal line, and thus working states at some positions are obviously different from those at other positions.

For example, the first included angle, the second included angle, the third included angle, and the fourth included angle are all 45 degrees, so that the first touch electrode and the second touch electrode are relatively symmetric and uniform in pattern. Of course, the embodiment of the present disclosure does not limit sizes of the first included angle, the second included angle, the third included angle, and the fourth included angle.

Figure 5:
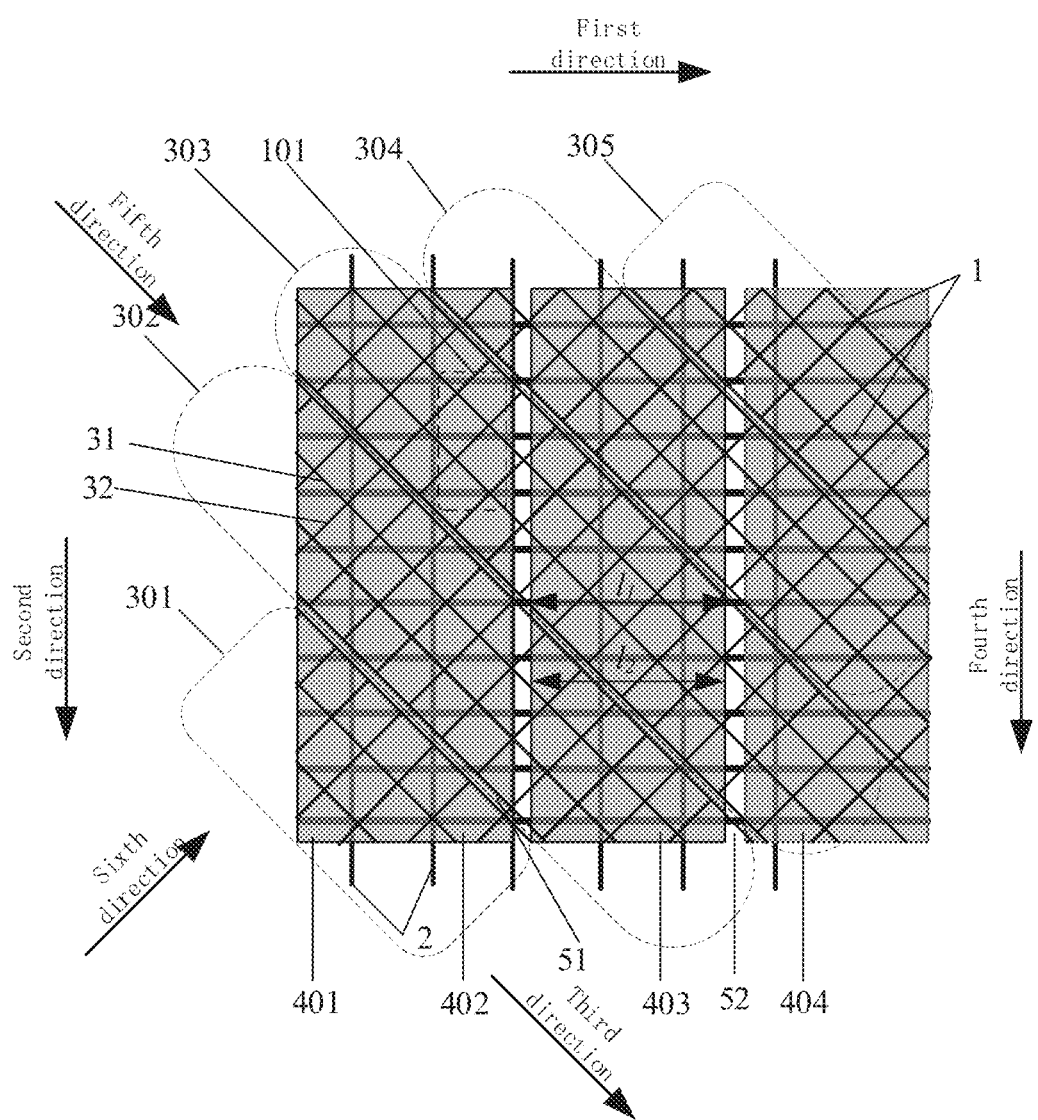
FIG. 5 is a schematic diagram of a still another touch substrate applied to an array driving structure and provided by an embodiment of the present disclosure.

FIG. 5 is a schematic diagram of a still another touch substrate applied to an array driving structure and provided by an embodiment of the present disclosure. For example, a maximum length of first touch electrodes in a first direction is substantially equal to a maximum length of second touch electrodes in the first direction. A first touch electrode 303 and a second touch electrode 403 are described as an example below. Of course, it can also be the same for other first touch electrodes and second touch electrodes, and it is not only limited to the first touch electrode 303 and the second touch electrode 403. As illustrated in FIG. 5, for example, a maximum length $l_1$ of the first touch electrode 303 in the first direction is substantially equal to a maximum length $l_2$ of the second touch electrode 403 in the first direction. As such, for example, in a situation that the first touch electrode 303 and the second touch electrode 403 have an electrical signal, an overlapping length of a first signal line 1 and the first touch electrode 303 and an overlapping length of the first signal line 1 and the second touch electrode 403 are substantially equal so as to better reduce a difference between an overlapping area where the first signal line 1 with the electrical signal overlaps the first touch electrode with the electrical signal and an overlapping area where the first signal line 1 overlaps the second touch electrode with the electrical signal. Or, similarly, in other embodiments, a maximum length of the first touch electrode in a second direction is substantially equal to a maximum length of the second touch electrode in the second direction. In a similar way, a difference between an overlapping area where the second signal line 2 with the electrical signal overlaps the first touch electrode with the electrical signal and an overlapping area where the second signal line 2 overlaps the second touch electrode with the electrical signal can be better reduced. It is to be noticed that, the maximum length of the first touch electrode in the first direction is substantially equal to the maximum length of the second touch electrode in the first direction, including the case where the maximum length of the first touch electrode in the first direction is strictly equal to the maximum length of the second touch electrode in the first direction, and the case where the maximum length of the first touch electrode in the first direction is approximately equal to the maximum length of the second touch electrode in the first direction, for example, a difference therebetween does not exceed 10% of the maximum length of the first touch electrode in the first direction.

For example, in another embodiment, the second touch electrodes and the first touch electrodes are disposed in different layers. An insulating layer is provided between the first touch electrode and the second touch electrode to insulate the first touch electrode from the second touch electrode. Second gaps is between the plurality of second touch electrodes and are configured to insulate the plurality of second touch electrodes from one another.

At least one embodiment of the present disclosure further provides a display panel, and the display panel includes any one of touch substrate provided by the embodiment of the present disclosure and an array driving structure in the above-mentioned embodiment.

For example, the array driving structure is a display array structure, and includes pixel arrays. For example, a first signal line of the array driving structure is a gate line for the pixel array, and a second signal line of the array driving structure is a data line for the pixel array. The first signal line and the second signal line are, for example, signal lines of a metallic material, and the metallic material is, for example, copper, aluminum, a copper alloy, an aluminum alloy, or the like.

The display panel provided by the embodiment of the present disclosure can avoid horizontal stripes or uneven gray scales due to a great difference in the overlapping areas between the first touch electrode and the first signal line or the second signal line at various positions in the first direction or the second direction as described above. For positional relationships and technical effects of the first signal line and the second signal line with the first touch electrode and the second touch electrode, please refer to the descriptions in the previous embodiments about the touch substrate, which will not be repeated here.

Figure 7:
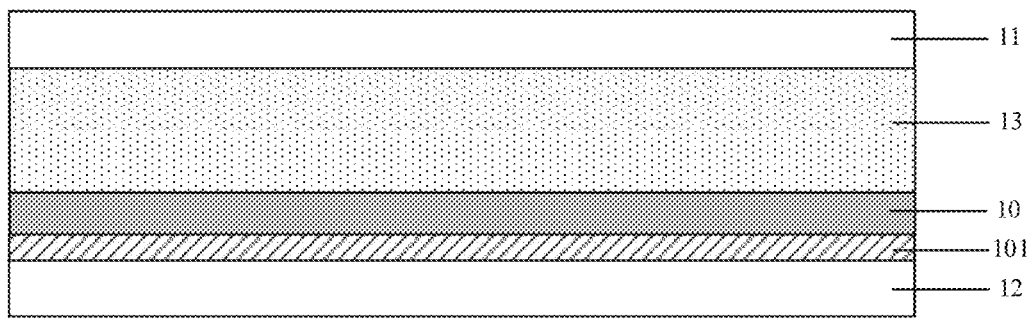
FIG. 7 is a schematic diagram of a display panel provided by an embodiment of the present disclosure.

Exemplarily, FIG. 7 is a schematic diagram of a display panel provided by an embodiment of the present disclosure. As illustrated in FIG. 7, a display panel 100 comprises any one of touch substrate 10 provided by the embodiment of the present disclosure and a display array structure 101. The following display array structure 101 is an example of an array driving structure.

For example, the display panel 100 is an in-cell liquid crystal display panel. The liquid crystal display panel comprises a first substrate 11 and a second substrate 12 opposite to each other. For example, the touch substrate 10 is located on one side of the second substrate 12 facing towards the first substrate 11, that is, a touch electrode structure is located on the side of the second substrate 12 facing towards the first substrate 11. The array driving structure 101 is located on the side of the second substrate 12 facing towards the first substrate 11, and is stacked with the touch substrate 10 in a direction perpendicular to the second substrate 12. For example, a liquid crystal layer 13 is provided between the touch substrate 10 and the first substrate 11. In the embodiment as illustrated in FIG. 7, the touch substrate 10 is located on one side of the array driving structure 101 close to the first substrate 11. In other embodiments, the touch substrate 10 may also be located on one side of the array driving structure 101 facing away from the first substrate 11, which is not limited by the embodiment of the present disclosure. The touch substrate provided by at least one embodiment of the present disclosure has characteristics of lightness and thinness, and is suitable for manufacturing the in-cell liquid crystal display panel, so that the liquid crystal display panel has the characteristics of lightness and thinness while avoiding a problem that a coupling capacitance generated by a first touch electrode and a first signal line or a second signal line is greatly different from a coupling capacitance generated by a second touch electrode and the first signal line or the second signal line, which causes that working states at some positions are obviously different from those at other positions, and the liquid crystal display panel provided by the above-mentioned embodiment of the present disclosure is enabled to have higher display quality.

For example, in the liquid crystal display panel 100, the first touch electrode and the second touch electrode are further configured as common electrodes of the liquid crystal display panel. That is, the first touch electrode and the second touch electrode are reused as the common electrodes of the liquid crystal display panel. For example, a time-sequence scanning or frequency scanning method can be used to realize a touch function and a display function.

The display panel provided by another embodiment of the present disclosure may also be an organic light-emitting diode (OLED) display panel, a quantum dot light-emitting diode (QLED) display panel, an electronic paper display panel, etc. A touch substrate is stacked with an array driving structure, including pixel arrays, of the display panel. Categories of the display panel provided by the embodiment of the present disclosure are not limited to the above-mentioned categories.

For example, at least one embodiment of the present disclosure further provides a display device, and the display device comprises any one of display panel provided by the embodiment of the present disclosure.

For example, the display device may be a liquid crystal display device or an OLED display device or the like. For example, the display device may be any product or component having a display function, such as a mobile phone, a tablet personal computer, a television, a display, a laptop computer, a digital photo frame, and a navigator.

For example, at least one embodiment of the present disclosure further provides a manufacturing method of a touch substrate, which is suitable for an array driving structure. Referring to FIGS. 1 to 2, and FIGS. 3A to 3C, the array driving structure includes: first signal lines 1 extending in a first direction and second signal lines 2 extending in a second direction intersecting with the first direction. The manufacturing method of a touch substrate comprises: forming a touch electrode structure, the touch electrode structure being configured to be stacked with the array driving structure.

Herein, the forming the touch electrode structure includes: forming a first touch electrode 303 and forming a second touch electrode 402; the first touch electrode 303 extends in a third direction, the third direction is different from the first direction and the second direction, and the second touch electrode 402 extends in a fourth direction, and is insulated from and intersects the first touch electrode 303. The touch substrate as illustrated in FIG. 1 comprises a plurality of first touch electrodes 301/302/303/304/305 and a plurality of second touch electrodes 401/402/403/404, and herein, the first touch electrode 303 and the second touch electrode 402 are used as an example to describe a positional relationship therebetween.

For example, the array driving structure is a display array structure, and the display array structure includes pixel arrays. For example, the first signal line is a gate line for the pixel array, and the second signal line is a data line for the pixel array.

For example, in one embodiment, the fourth direction is the same as one of the first direction and the second direction. In another embodiment, the fourth direction is different from both the first direction and the second direction, and for technical effects, please refer to the descriptions in the previous embodiments.

For example, the forming the second touch electrode includes: forming a plurality of electrode blocks and a plurality of connection portions. Referring to FIG. 2, in the fourth direction, a plurality of electrode blocks 411/412/413 and a plurality of connection portions 41/42 are alternately distributed. For example, the plurality of electrode blocks 411/412/413 and the first touch electrode (such as a first grid line 31 and a second grid line 32) are formed by performing a single patterning process on the same film layer to simplify a manufacturing process of the touch substrate. Each of the plurality of connection portions 41/42 is provided in a different layer from the first touch electrode and is electrically connected with two adjacent ones in the plurality of electrode blocks 411/412/413 so that the plurality of electrode blocks 411/412/413 are electrically connected with each other through the plurality of connection portions 41/42. For example, the manufacturing method of a touch substrate further comprises forming an insulating layer located between the plurality of connection portions 41/42 and the first touch electrode to insulate the plurality of connection portions 41/42 from the first touch electrode.

In combination with FIG. 1 and FIGS. 3A to 3C, for example, the manufacturing method of a touch substrate further comprises: forming a plurality of second touch electrodes 401/402/403/404. Second gaps 52 are provided between the plurality of second touch electrodes and are configured to insulate the plurality of second touch electrodes from one another. Each of the plurality of second touch electrodes 401/402/403/404 includes a plurality of electrode blocks and a plurality of connection portions.

For example, the first touch electrode includes a grid pattern, the grid pattern includes first grid lines 31 extending in a fifth direction and second grid lines 32 extending in a sixth direction. The first grid lines 31 and the second grid lines 32 intersect each other, the fifth direction is different from both the first direction and the second direction, or the sixth direction is different from both the first direction and the second direction. Thus, compared with the case where the fifth direction is the same as the first direction or the second direction, or compared with the case where the sixth direction is the same as the first direction or the second direction, a difference in overlapping areas between the first touch electrode and the first signal line or the second signal line at various positions in the first direction or in the second direction is reduced. For specific technical effects, please refer to the descriptions in the previous embodiments.

For example, in combination with FIG. 1 and FIGS. 3A to 3B, the touch substrate comprises a plurality of first touch electrodes 301/302/303/304/305, each of the plurality of first touch electrodes 301/302/303/304/305 includes a grid pattern, and a first gap is between two adjacent ones of the plurality of first touch electrodes 301/302/303/304/305 and is configured to insulate the two adjacent ones of the plurality of first touch electrodes a first gap is between two adjacent ones of the plurality of first touch electrodes and is configured to insulate the two adjacent ones of the plurality of first touch electrodes from each other.

For example, film layers such as the first touch electrode and the second touch electrode of the touch substrate may be formed by using a patterning process such as a photolithography process. For a specific forming process, those skilled in the art may refer to conventional techniques.

In a manufacturing method of a touch substrate provided by another embodiment, a plurality of second touch electrodes and first touch electrodes are provided in different layers. The manufacturing method of a touch substrate further comprises: forming an insulating layer located between the first touch electrode and the second touch electrode to insulate the first touch electrode from the second touch electrode. Second gaps are provided between the plurality of second touch electrodes and are configured to insulate the plurality of second touch electrodes from one another.

For example, in one embodiment, the above-mentioned touch substrate may be separately formed, for example, a base substrate is provided, a touch electrode structure is formed on the base substrate by using the above-mentioned method, and then the touch substrate is combined with an array driving structure. For example, the array driving structure itself is formed on another base substrate, and the array driving structure may be in various appropriate types, for example, a display array structure, thereby including pixel arrays. According to a display type, the display array structure can be obtained by using a corresponding preparation method in the art, which will not be repeated here.

For example, in another embodiment, a manufacturing method of a touch substrate comprises: providing an array driving structure, and then directly forming the above-mentioned touch electrode structure on the array driving structure. For example, providing the array driving structure on a base substrate, and the base substrate is, for example, a glass substrate, a plastic substrate, etc. The plastic substrate may be a flexible substrate.

It is to be noticed that, other features and technical effects of the touch substrate are not mentioned in the embodiments of the manufacturing method of a touch substrate, are the same as those described in the previous embodiments about the touch substrate, and are not repeated here.

What is mentioned above is only exemplary embodiments of the present disclosure and is not intended to limit the scope of protection of the present disclosure. The scope of protection of the present disclosure is determined according to the scope defined by the claims.

The invention claimed is:

1. A touch substrate, applicable to an array driving structure, the array driving structure comprising: a first signal line extending in a first direction and a second signal line extending in a second direction intersecting with the first direction;
    the touch substrate comprising:
    a touch electrode structure, configured to be stacked with the array driving structure and comprising:
    a first touch electrode, extending in a third direction, the third direction being different from both the first direction and the second direction; and
    a second touch electrode, extending in a fourth direction, the second touch electrode being insulated from and intersecting the first touch electrode,
    wherein the second touch electrode overlaps with the first touch electrode in a direction perpendicular to a plane where the touch substrate is located.

2. The touch substrate according to claim 1, wherein the fourth direction is different from both the first direction and the second direction.

3. The touch substrate according to claim 1, wherein a maximum length of the first touch electrode in the first direction is substantially equal to a maximum length of the second touch electrode in the first direction, or
    a maximum length of the first touch electrode in the second direction is substantially equal to a maximum length of the second touch electrode in the second direction.

4. The touch substrate according to claim 1, wherein the first touch electrode comprises a grid pattern,
    the grid pattern comprises a first grid line extending in a fifth direction and a second grid line extending in a sixth direction, and the first grid line and the second grid line intersect each other,
    the fifth direction is different from both the first direction and the second direction, or the sixth direction is different from both the first direction and the second direction.

5. The touch substrate according to claim 4, wherein the touch substrate comprises a plurality of first touch electrodes;
    each of the plurality of first touch electrodes comprises the grid pattern, and a first gap is between two adjacent ones of the plurality of first touch electrodes and is configured to insulate the two adjacent ones of the plurality of first touch electrodes from each other.

6. The touch substrate according to claim 4, wherein both the first grid line and the second grid line are made from a transparent conductive material or a metallic material.

7. The touch substrate according to claim 1, wherein the second touch electrode comprises a plurality of electrode blocks and a plurality of connection portions;
    the plurality of electrode blocks and the plurality of connection portions are alternately distributed in the fourth direction, the plurality of electrode blocks are arranged in a same layer as the first touch electrode, and the plurality of connection portions are arranged in a different layer from the first touch electrode and are electrically connected with two adjacent ones of the plurality of electrode blocks, so that the plurality of electrode blocks are electrically connected with one another through the plurality of connection portions.

8. The touch substrate according to claim 7, wherein the touch substrate comprises a plurality of second touch electrodes, the plurality of second touch electrodes are arranged in a different layer from the first touch electrode, a second gap is between the plurality of second touch electrodes and is configured to insulate the plurality of second touch electrodes from one another.

9. The touch substrate according to claim 7, wherein the array driving structure is a display array structure comprising a pixel array, and the pixel array comprises a plurality of sub-pixels arranged in an array; and the touch electrode structure and the display array structure are arranged on a base substrate;
    an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate.

10. The touch substrate according to claim 9, wherein:
    the pixel array comprises a black matrix that defines the plurality of sub-pixels arranged in the array;

the first grid line and the second grid line each comprises a first sawtooth edge, and each of the plurality of electrode blocks comprises a second sawtooth edge;
a planar shape of the first sawtooth edge is complementary to a planar shape of the second sawtooth edge, and an orthographic projection of the first sawtooth edge on the base substrate at least partially overlaps with an orthographic projection of the black matrix on the base substrate.

11. The touch substrate according to claim 10, wherein a third gap is between the first sawtooth edge and the second sawtooth edge, so that each of the plurality of electrode blocks is insulated from both the first grid line and the second grid line of the first touch electrode.

12. The touch substrate according to claim 4, wherein:
the touch substrate comprises a plurality of first touch electrodes; and each of the plurality of first touch electrodes comprises the grid pattern, and a first gap is between two adjacent ones of the plurality of first touch electrodes and is configured to insulate the two adjacent ones of the plurality of first touch electrodes from each other;
the second touch electrode comprises a plurality of electrode blocks and a plurality of connection portions; and the plurality of electrode blocks and the plurality of connection portions are alternately distributed in the fourth direction, the plurality of electrode blocks are arranged in a same layer as the first touch electrode, and the plurality of connection portions are arranged in a different layer from the first touch electrode and are electrically connected with two adjacent ones of the plurality of electrode blocks, so that the plurality of electrode blocks are electrically connected with one another through the plurality of connection portions;
the array driving structure is a display array structure comprising a pixel array, and the pixel array comprises a plurality of sub-pixels arranged in an array; the touch electrode structure and the display array structure are arranged on the base substrate; a planar shape of a first sawtooth edge is complementary to a planar shape of a second sawtooth edge; an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate;
a third gap is between the first sawtooth edge and the second sawtooth edge, so that each of the plurality of electrode blocks is insulated from both the first grid line and the second grid line of the first touch electrode;
the touch substrate comprises a plurality of second touch electrodes, the plurality of second touch electrodes are arranged in a different layer from the first touch electrode, and a second gap is between the plurality of second touch electrodes and is configured to insulate the plurality of second touch electrodes from one another; and
both the first grid line and the second grid line are made from a transparent conductive material or a metallic material.

13. A display panel, comprising the touch substrate according to claim 1,
wherein the array driving structure is a display array structure comprising a pixel array, and
wherein the display panel is an in-cell liquid crystal display panel, and the liquid crystal display panel comprises a first substrate and a second substrate opposite to each other, the touch electrode structure is located on a side of the first substrate facing towards the second substrate, and the array driving structure is located on a side of the second substrate facing towards the first substrate.

14. The display panel according to claim 13, wherein the first touch electrode and the second touch electrode are further configured as common electrodes of the liquid crystal display panel, and
wherein the first signal line is a gate line for the pixel array, and the second signal line is a data line for the pixel array.

15. A manufacturing method of a touch substrate, the touch substrate being applicable to an array driving structure, and the array driving structure comprising: a first signal line extending in a first direction and a second signal line extending in a second direction intersecting with the first direction; and the manufacturing method comprising:
forming a touch electrode structure, wherein the touch electrode structure is configured to be stacked with the array driving structure; the forming the touch electrode structure comprises:
forming a first touch electrode, wherein the first touch electrode extends in a third direction, and the third direction is different from both the first direction and the second direction; and
forming a second touch electrode, wherein the second touch electrode extends in a fourth direction, and the second touch electrode is insulated from and intersects the first touch electrode,
wherein the second touch electrode overlaps with the first touch electrode in a direction perpendicular to a plane where the touch substrate is located.

16. The manufacturing method according to claim 15, wherein the fourth direction is different from both the first direction and the second direction,
wherein the first touch electrode comprises a grid pattern, the grid pattern comprises a first grid line and a second grid line which intersect each other, the first grid line extending in a fifth direction, the second grid line extending in a sixth direction, and
wherein the fifth direction is different from both the first direction and the second direction, or the sixth direction is different from both the first direction and the second direction.

17. The manufacturing method according to claim 16, wherein the touch substrate comprises a plurality of first touch electrodes;
each of the plurality of first touch electrodes comprises the grid pattern, and a first gap is between two adjacent ones of the plurality of first touch electrodes and is configured to insulate the two adjacent ones of the plurality of first touch electrodes from each other.

18. The manufacturing method according to claim 15, wherein the forming the second touch electrode comprises:
forming a plurality of electrode blocks and a plurality of connection portions;
wherein the plurality of electrode blocks and the plurality of connection portions are alternately distributed in the fourth direction; and
the plurality of electrode blocks and the first touch electrode are formed by performing a single patterning process on a same film layer, and each of the plurality of connection portions is arranged in a different layer from the first touch electrode and is electrically connected with two adjacent ones of the plurality of electrode blocks, so that the plurality of electrode blocks are electrically connected with one another through the plurality of connection portions.

19. The manufacturing method according to claim 16, wherein the touch substrate comprises a plurality of second touch electrodes, the plurality of second touch electrodes are arranged in a different layer from the first touch electrode, and a second gap is between the plurality of second touch electrodes and is configured to insulate the plurality of second touch electrodes from one another, wherein the array driving structure is a display array structure comprising a pixel array, and the pixel array comprises a plurality of sub-pixels arranged in an array, and wherein an orthographic projection of the first grid line on the base substrate, an orthographic projection of the second grid line on the base substrate, and an orthographic projection of each of the plurality of electrode blocks on the base substrate all overlap with an orthographic projection of at least one of the plurality of sub-pixels on the base substrate.

20. The manufacturing method according to claim 19, comprising:

providing the array driving structure; and forming the touch electrode structure on the array driving structure.

* * * * *